United States Patent [19]

Paik et al.

[11] Patent Number: 5,136,411
[45] Date of Patent: Aug. 4, 1992

[54] DYNAMICALLY RESPONSIVE CATV SYSTEM WITH SHARED FIBER OPTIC LINK

[75] Inventors: Woo H. Paik, Encinitas, Calif.; David Grubb, III, Doylestown, Pa.; David E. Charlton, Corning, N.Y.

[73] Assignee: General Instrument Corporation, Chicago, Ill.

[21] Appl. No.: 409,214

[22] Filed: Sep. 19, 1989

Related U.S. Application Data

[63] Continuation-in-part of Ser. No. 131,812, Dec. 11, 1987.

[51] Int. Cl.$^5$ .............................................. H04J 14/02
[52] U.S. Cl. ............................... 359/125; 455/617; 358/84; 358/86
[58] Field of Search .............. 358/84, 86; 370/1, 3, 370/4; 455/4–7, 617, 612; 359/125–126, 128, 133, 137

[56] References Cited

U.S. PATENT DOCUMENTS

| | | | |
|---|---|---|---|
| 4,362,359 | 12/1982 | Dammann et al. | 350/96.19 |
| 4,395,780 | 7/1983 | Gohm | 455/601 |
| 4,441,180 | 4/1984 | Schuessler | 370/3 |
| 4,484,218 | 11/1984 | Boland | 455/4 |
| 4,491,983 | 1/1985 | Pinnow | 370/4 |
| 4,545,048 | 10/1985 | Hauk et al. | 370/1 |
| 4,574,305 | 3/1986 | Campbell et al. | 359/125 |
| 4,686,667 | 8/1987 | Ohnsorge | 370/4 |
| 4,705,350 | 11/1987 | Cheng | 350/96.16 |
| 4,734,764 | 3/1988 | Pocock | 455/4 |
| 4,834,481 | 5/1989 | Lawson et al. | 350/96.15 |
| 4,889,404 | 12/1989 | Bhagavatula | 350/96.16 |

FOREIGN PATENT DOCUMENTS 0128769 12/1984 European Pat. Off. .

OTHER PUBLICATIONS

Khoe, "TTOSS, A Subscriber Network for Direct Detection and Coherent Systems", 100C–ECOC '85, Venice, Oct. 1–4, 1985, pp. 479–482.

(List continued on next page.)

Primary Examiner—Edward L. Coles, Sr.
Assistant Examiner—Kinfe-Michael Negash
Attorney, Agent, or Firm—Edward W. Callan

[57] ABSTRACT

A CATV system uses a single single-mode optical fiber for transmitting a composite optical signal containing television signals in different frequency channels for a plurality of subscriber terminals from a headend terminal to a distribution terminal, and converts the transmitted signals at the distribution terminal into electrical signals for distribution to a plurality of subscriber terminals over a plurality of coaxial cables. The distribution terminal further receives electrical service request signals from each of the plurality of subscriber terminals, and converts each received service request signal into an optical service request signal for transmission to the headend terminal over the same single-mode optical fiber as used from transmitting the composite optical signal. Wavelength-division multiplexer/demultiplexers couple the optical fiber to the headend terminal and the distribution terminal to enable bidirectional transmission. The subscriber terminal is responsive to a control signal transmitted to the subscriber terminal for enabling a receiver therein to receive television signals transmitted to the subscriber terminal over a selected one of said different given frequency channels. The headend terminal includes a digital switch that is operated in coordination with the control signals that are transmitted to the subscriber terminals for enabling reception of only selected frequency channels in the respective subscriber terminals, by frequency positioning the television signal indicated by the service request signal received from a given subscriber terminal within the composite signal for transmission to the given subscriber terminal over the given frequency channel enabled by the control signal that is transmitted to the given subscriber terminal.

5 Claims, 4 Drawing Sheets

OTHER PUBLICATIONS

Hightower, "Economic FO System for New Residential Services", Telephony, Mar. 17, 1986, p. 44.

Gawdun, "Lightwave Systems in the Subscriber Loop", Telecommunication, May 1987, p. 65.

Garbanti, "Economic Analysis of Telecommunication Loop Architectures", Electronicast's Conference on Fiber Optics Beyond the Year 2000, Jun. 11, 1987.

Truesdale and Nolan, "Core/Clad Mode Coupling in a New Multiple Index Waveguide Structure," Corning, ECOC '86, pp. 181–183.

So, et al., "Multiple Wavelength Bidirectional Transmission for Subscriber Loop Applications", Electronic Letters, Jan. 5, 1989, vol. 25, No. 1, pp. 16–18.

Spalink, et al., "Bi-directional 1.3 mm/1.5 mm WDM Fiber-Optic 144 Mb/s Transmission System Experiment".

DYNAMICALLY RESPONSIVE CATV SYSTEM WITH SHARED FIBER OPTIC LINK

CROSS-REFERENCE TO RELATED APPLICATION

This is a continuation-in-part of application Ser. No. 07/131,812 filed Dec. 11, 1987 by Woo H. Paik, one of the named inventors herein.

BACKGROUND OF THE INVENTION

The present invention generally pertains to electronic communication systems and is particularly directed to the use of fiber optics in cable television (CATV) systems.

In a headend terminal of a typical CATV system, a plurality of television signals from separate television signal sources are amplitude modulated onto a plurality of carriers and then multiplexed to provide a multiplexed electrical signal. The multiplexed electrical signal is then transmitted to a distribution terminal (also known as a multi-tap or tap), from which it is further transmitted to each of a plurality of subscriber terminals over a corresponding plurality of coaxial cables that couple the distribution terminal to the plurality of subscriber terminals. Service request signals generated in the subscriber terminals typically are transmitted back to the headend terminal over telephone lines or through CATV distribution plants.

The use of optical fibers to transmit television signals in CATV systems has been suggested because of the superior long-distance transmission characteristics of optical fibers in comparison with the long-distance transmission characteristics of coaxial cable. Hightower, "Economic FO System For New Residential Services", Telephony, Mar. 17, 1986, p. 44, describes a CATV system in which the multiplexed electrical signal is converted at a central office to a multiplexed optical signal and then transmitted over a single-mode optical fiber to a multimode splitter, from which the multiplexed optical signal is distributed to a plurality of subscriber terminals over a corresponding plurality of multimode optical fibers. In the Hightower system, service request signals from the plurality of subscriber terminals are provided over separate fiber optic links to a second multimode splitter which transmits the service request signals over a multimode optical fiber to the central office. A switch used for multiplexing the signals at the central office is controlled in response to the service request signals.

The cost of such a CATV system using fiber optic links to each of the subscriber terminals is very high in comparison with the cost of a typical prior art CATV system, which uses coaxial cable links to each of the subscriber terminals.

SUMMARY OF THE INVENTION

The present invention provides an economical CATV system that uses a single optical fiber for transmitting information signals, such as television signals, for a plurality of subscriber terminals from a headend terminal to a distribution terminal, and converts the transmitted signals at the distribution terminal into electrical signals for distribution to the plurality of subscriber terminals over a plurality of electrical signal conduits, such as coaxial cables. The CATV system of the present invention thereby utilizes the superior long distance transmission characteristics of optical fibers for the link between the headend terminal and the distribution terminal, and utilizes the lower cost coaxial cable for the plurality of links between the distribution terminal and the subscriber terminals where the length of such links is such that the difference in transmission characteristics between coaxial cable and optical fibers is not as significant.

The CATV system of the present invention includes a headend terminal and a plurality of distribution terminals, with each distribution terminal being coupled to the headend terminal by a separate single optical fiber for transmitting the composite optical signal from the converting means of the headend terminal to each distribution terminal. The headend terminal includes means for providing a plurality of information signals for a plurality of subscriber terminals; switch means responsive to subscriber requests for dynamically selecting the plurality of information signals to provide a composite electrical signal; and means for converting the composite electrical signal into a composite optical signal for transmission. Each distribution terminal includes means for receiving said transmitted composite optical signal and for converting it into electrical signals for distribution to the different subscriber terminals.

Accordingly, preexisting CATV systems that use coaxial cable throughout their distribution links may be readily retrofitted with the system of the present invention without having to replace the coaxial cable links from the distribution terminal to the subscriber terminals.

In another aspect, the present invention provides a distribution terminal for a CATV system in which a composite optical signal containing information signals for a plurality of subscribers is transmitted optically from a headend terminal to a plurality of distribution terminals, and then distributed from the distribution terminals to different subscriber terminals. The distribution terminal of the present invention includes means for receiving said transmitted composite optical signal; and means for converting the received composite optical signal into electrical signals for distribution to the different subscriber terminals.

In still another aspect, the present invention provides a subscriber terminal for a CATV system in which a composite signal containing information signals for a plurality of subscribers is transmitted to different subscriber terminals in response to service-request signals received from the subscriber terminals. The subscriber terminal of the present invention includes means for receiving information signals transmitted to the subscriber terminal over a plurality of different given frequency channels; and means responsive to a control signal transmitted to the subscriber terminal for enabling the receiving means to receive information signals transmitted to the subscriber terminal over a selected one of said different given frequency channels.

In a further aspect, the present invention provides a CATV system in which information signals for a plurality of subscribers are transmitted from a headend terminal to different subscriber terminals. The system includes a headend terminal including means for providing a plurality of information signals for a plurality of subscriber terminals; switch means for selecting and processing the plurality of information signals to provide a composite optical signal for transmission; and means for controlling said switch means in response to optical service-request signals received from the subscriber terminals; and a single-mode optical fiber connected to the headend terminal by a wavelength-division multiplexing/demultiplexing means for both transmitting the composite optical signal from the converting means of the headend terminal, and transmitting the optical service-request signals to the headend terminal, wherein the wavelength-division multiplexing/demultiplexing means is adapted for propagating short-wavelength light over the optical fiber in one direction and for simultaneously receiving long-wavelength light propagated over the optical fiber in the opposite direction.

In a still further aspect, the present invention provides a bidirectional optical transmission system for distributing high bandwidth video signals, comprising a conventional single-mode optical fiber with a cut-off wavelength greater than approximately 1200 nm, first wavelength-division multiplexing/demultiplexing means connected to one end of the single-mode optical fiber and adapted for propagating long-wavelength light over the optical fiber in a first direction and for simultaneously receiving short-wavelength light propagated over the optical fiber in the opposite direction; and second wavelength-division multiplexing/demultiplexing means connected to the other end of the single-mode optical fiber and adapted for propagating short-wavelength light over the optical fiber in the opposite direction and for simultaneously receiving long-wavelength light propagated over the optical fiber in said first direction.

Additional features of the present invention are described in relation to the description of the preferred embodiment.

DESCRIPTION OF THE PREFERRED EMBODIMENTS

Figure 1:
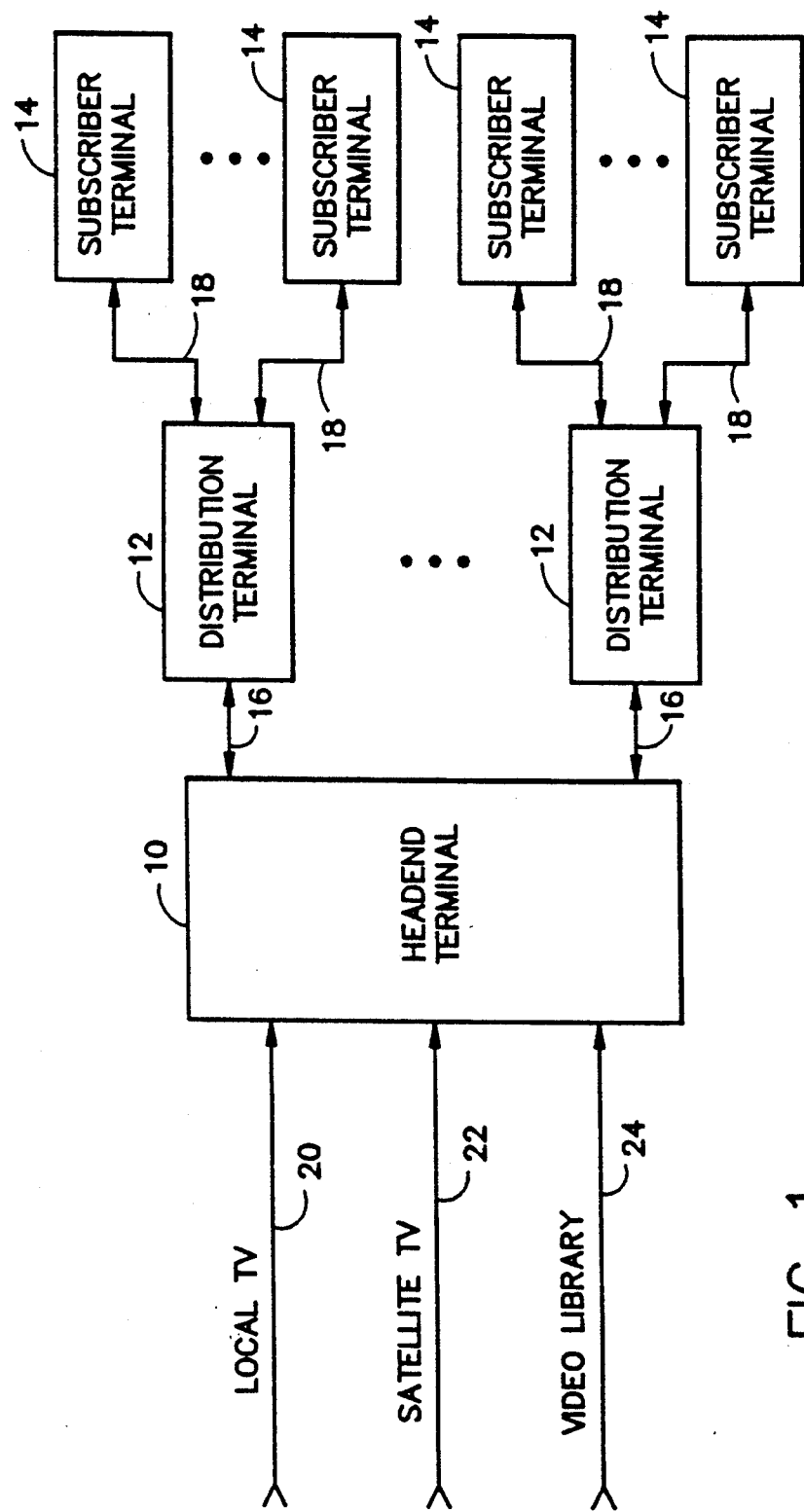
FIG. 1 is a diagram of a preferred embodiment of the CATV system of the present invention.

Referring to FIG. 1, a preferred embodiment of a CATV system according to the present invention includes a headend terminal 10, a plurality of distribution terminals 12 and a plurality of subscriber terminals 14.

Each distribution terminal 12 is connected to the headend terminal 10 by a single single-mode optical fiber 16. Each distribution terminal 12 is also connected to a plurality of subscriber terminals 14 by a corresponding plurality of coaxial cables 18.

The headend terminal 10 dynamically selects television signals from a number of different sources, such as locally broadcast television programs 20, television programs broadcast via a communication satellite 22, and prerecorded programs from a video-tape library 24, for the plurality of subscriber terminals 14 in response to subscriber requests and provides on each optical fiber 16 a composite optical signal containing the television signals selected for transmission to the subscriber terminals 14 connected to the distribution terminal 12 to which the respective optical fiber 16 is connected. Each composite signal contains a predetermined number of frequency channels occupying different portions of a given transmission band.

Each distribution terminal 12 converts the composite optical signal received from a single optical fiber 16 into composite electrical signals for distribution over the coaxial cables 18 to each of the different subscriber terminals 14. Each composite electrical signal provided on a coaxial cable 18 from a given distribution terminal 12 contains the same predetermined number of channels as the composite optical signal received over the single optical fiber 16 connected to the given distribution terminal 12.

Each subscriber terminal 14 includes a receiver for receiving the television signals included in the composite electrical signal transmitted from the connected distribution terminal 12 over the connecting coaxial cable 18; and is responsive to a control signal transmitted to the subscriber terminal 14 within such composite signal for enabling the receiver of the subscriber terminal 14 to receive a television signal transmitted to the subscriber terminal 14 from the distribution terminal 12 over a selected one of the different given frequency channels of the composite signal.

Service-request signals are generated in the subscriber terminals 14 and transmitted electrically over the coaxial cables 18 to the respective distribution terminals 12 to which the subscriber terminals 14 are connected. Each distribution terminal 12 converts the electrical service-request signals received over the coaxial cables 18 from the subscriber terminals 14 into optical service-request signals for transmission to the headend terminal 10 over the single optical fiber 16.

The headend terminal 10 converts the optically transmitted service-request signals received over the optical fibers 16 from the respective distribution terminals 12 and converts them into electrical service-request signals, which are processed by the headend terminal 10 to dynamically control the selection of the television signals that are provided on the different frequency channels included in the composite signals transmitted to the different distribution terminals 12 over the different optical fibers 16.

The headend terminal 10 operates in coordination with the control signals that are transmitted to the subscriber terminals 14 for enabling reception of only selected frequency channels in the respective subscriber terminals 14, by frequency positioning the television signal indicated by the service request signal received from a given subscriber terminal 14 within the composite signal for transmission to the given subscriber terminal 14 over the given frequency channel enabled by the control signal that is transmitted to the given subscriber terminal 14.

Figure 2:
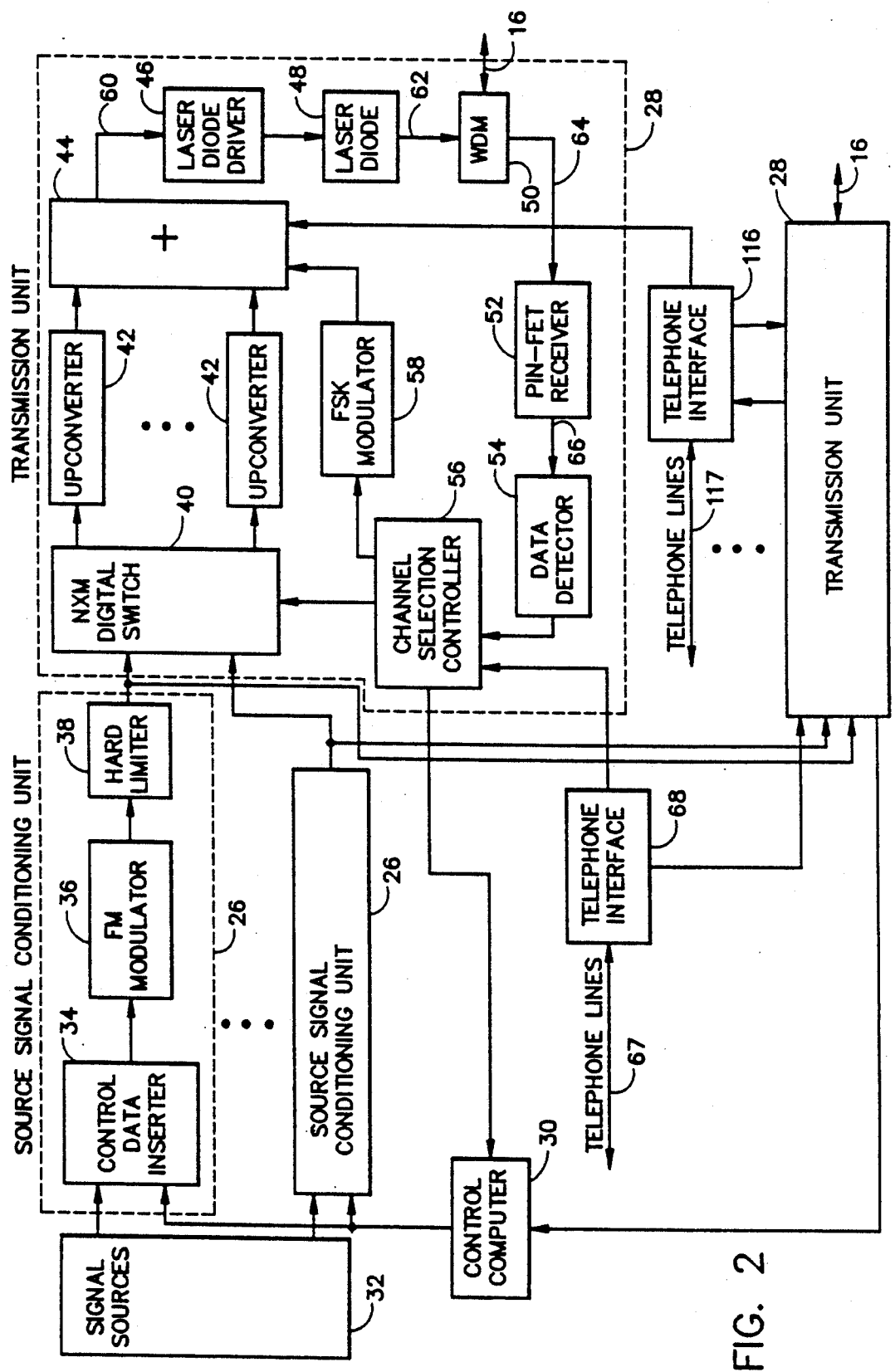
FIG. 2 is a diagram of a preferred embodiment of the headend terminal in the system of FIG. 1.

Referring to FIG. 2, the headend terminal includes a plurality of source-signal conditioning units 26 a plurality of transmission units 28, and a control computer 30. The source-signal conditioning units 26 are respectively connected to different sources of television signals 32, such as programs derived from local broadcasts, satellite transmissions, and video tapes of prerecorded programs. The number of source-signal conditioning units 26 is limited only by the number of different sources that are accessed to provide different television signals for transmission to the subscriber terminals 14. The number of transmission units 28 corresponds to the number of distribution terminals 12.

Each source-signal conditioning unit 26 includes a control data inserter 34, an FM modulator 36 and a hard limiter 38.

The control data inserter 34 inserts control data into the television signal provided from a given source 32. The control data inserter 34 inserts such control data into a blanking interval of the television signal, such as the horizontal blanking interval, as described in U.S. Pat. No. 4,613,901 to Klein S. Gilhousen, Charles F. Newby, Jr. and Karl E. Moerder. The control data includes the aforementioned control signal that enables a receiver of a given subscriber terminal 14 to receive a television signal occupying a selected predetermined frequency channel. This control signal is provided to the control data inserter 34 by the control computer 30, which also keeps track of subscriber data. The control data may further include such data as is necessary for descrambling the television signal if such signal is transmitted in a scrambled format. The control data inserter 34 may further convert the audio portion of the provided television signal into digital audio signals and insert the digital audio signals into the horizontal blanking intervals together with the control data, as also described in U.S. Pat. No. 4,613,901.

The FM modulator 36 modulates the television signal at 60 MHz after the control data has been inserted; and the modulated television signal is hard limited by the hard limiter 38 for provision to a transmission unit 28.

Each transmission unit 28 includes an N×M digital switch 40, M upconverters 42, a signal combining unit 44, a laser diode driver 46, a laser diode 48, a wavelength-division multiplexer/demultiplexer (WDM) 50, a PIN-FET receiver 52, a data detector 54, a channel selection controller 56 and a FSK modulator 58.

M is the predetermined number of different frequency channels that are provided in the transmitted frequency band; and N is at least the number of different source-signal conditioning units 26. The source-signal conditioning units 26 are connected in the parallel to the digital switches 40 in the different transmission units 28. The digital switch 40 provides television signals at M different outputs to the M different upconverters 42. Each upconverter 42 modulates the signal that it receives from the digital switch 40 to a different frequency channel. The interconnection of the different upconverters 42 to the respective source-signal conditioning units 26 is controlled by the channel selection controller 56. A given source-signal conditioning unit 26 is interconnected by the digital switch 40 to more than one upconverter 42 when more than one subscriber terminal 14 is to receive the television signal provided by the given source-signal conditioning unit 26, or when more than one receiver at a given subscriber terminal 14 is to receive the television signal provided by the given source-signal conditioning unit 26.

The signal combining unit 44 combines the television signals on the different frequency channels provided by the upconverters 42 to provide a composite electrical signal on line 60 containing the upconverted television signals on the M different frequency channels.

The laser diode driver 46 and the laser diode 48 convert the composite electrical signal on line 60 to a composite optical signal 62.

The wavelength-division multiplexer/demultiplexer (WDM) 50 couples a conventional single-mode optical fiber 16 to both the laser diode 48 and the PIN-FET receiver 52 for enabling both the transmission of the composite optical signal 62 from the laser diode 48 over the conventional single-mode optical fiber 16 to the optical receiver 72 (FIG. 3) at the distribution terminal 12 (FIG. 1), and the receipt by the PIN-FET receiver 52 of optical service-request signals 64, or other low bandwidth signals (e.g., 1.5 Mbit/sec T1 telephone transmission), transmitted over the optical fiber 16 to the headend terminal 10.

The WDM 50 provides for simultaneous propagation of long-wavelength light into conventional single-mode optical fiber 16 and short-wavelength light received from optical fiber 16 through known wavelength-division multiplexing/demultiplexing techniques. One form of WDM comprises a pair of optical fibers which are held together, heated, stretched and fused to create opposite facing beam broadening tapers separated by an elongated coupling region. An example of a stretched and fused WDM designed for use in a system with purely single-mode transmission at 1320 and 1550 nm is given in U.S. Pat. No. 4,834,481 to Lawson et al. Preferably, the WDM is formed in a multiple index fiber-in-tube structure of the sort described in U.S. patent application Ser. No. 223,423, filed Jul. 25, 1988, which is copending with the present application. The manufacturing process for these fiber-in-tube WDMs does not require etching of the fiber. With this design, the fiber-in-tube WDMs exhibited isolation of 10–15 dB for 1300 nm and greater isolation at 850 nm.

The cut-off wavelength of a characterized optical fiber is defined as the wavelength at which transmission over such a fiber results in propagation of more than one mode, i.e., multimode transmission. Transmission or two or more modes is considered to be multimode transmission as the term is used in this application. Long-wavelength light, as used herein, means light with a wavelength greater than the cut-off wavelength of the conventional single-mode fiber used in the system, Short-wavelength light, as used herein, means light with a wavelength less than said cut-off wavelength. Typically, using conventional single-mode fiber with a cut-off wavelength around 1240 nm and above, and using widely available laser sources, the range of long-wavelength single-mode propagation over the fiber is approximately 1240 nm to 1550 nm. At short wavelengths below approximately 1240 nm the propagation over such fiber is multimode. "Conventional" single-mode fiber as used herein means a matched clad or depressed clad fiber without a special refractive index profile designed to increase the bandwidth of multimode transmission.

In the present system, two preferred short wavelengths are 750 nm and 850 nm; and a preferred long wavelength is 1300 nm, as economical laser sources are available at these wavelengths. The part numbers for the short-wavelength lasers: are Mitsubishi FU-04LD-N for the 850 nm laser, and FU-01SLD-N(4406) for the the 750 nm laser, as referenced in the Mitsubishi 1988 Optoelectronic Components Catalog. For most systems, using such short wavelengths would be a fatal drawback, as the available bandwidth of the multimode transmission at 850 nm (approximately 200–400 MHz km) is two orders of magnitude less than the available bandwidth of the single-mode transmission over the single-mode fiber at 1300 nm (greater than 20 GigaHz km). Special fibers have been used to provide greater bandwidth multimode transmission. An example of such a special fiber is disclosed in U.S. patent application Ser. No. 259,723, filed Oct. 19, 1988, which is copending with the present application. (See also, Turesdale and Nolan, E.C.O.C. 1986 Technical Digest, Vol. 1, p. 181 (1986), Barcelona, Sp.

In the present system, the bandwidth disparity is matched with the system requirements and the preferred opto-electronic components to provide an economical bi-directional system using conventional single-mode optical fiber with maximum transmission distance and minimum cost. The high bandwidth single-mode transmission link is suitable for transmission of the television signals over a moderate distance (e.g., 12 km), and the lower bandwidth multimode transmission link is sufficient for transmission of the service-request signals and other low bandwidth signals over the same distance. Preferably, the system design may be selected so that a substantial fraction of the available bandwidth in each direction may be utilized without wasting bandwidth in one direction because of the bandwidth/distance limitations of the transmission link in the other direction.

Moreover, the present system enables the use of low-cost conventional single-mode optical fiber, and low-cost compact disk (CD) lasers, while enabling 3dB demultiplexing so that no light is wasted simply due to system design. Outside the CATV field, some bi-directional transmission systems have been suggested for use with a single fiber. However these systems have substantial drawbacks when contrasted with the present invention. For example, such systems transmitting at 1300 nm in both directions typically require the waste of half of the signal in each direction. As another example, such WDM-based systems transmitting solely single-mode light at 1300 nm and 1550 nm require expensive 1550 nm transmitter/receiver technology.

The particular fiber-in-tube design of WDM described herein operates a very effective mode filter, in part because of the increased taper angle that this design provides. This makes possible the filtering of the multimode 750 nm (or 850 nm) signal into a single-mode signal with reduced power for reception by the PIN-FET receiver 52. This is an optional feature; it may be used to increase the signal to noise (S/N) ratio of the lower bandwidth signal over the multimode transmission link by eliminating the mode partition noise. When used in the present invention, the WDM 70 converts the optical service-request signals generated at 750 nm (or 850 nm) into a single-mode signal that is launched into the optical fiber 16. Because the 750 nm (or 850 nm) signal is below the cut-off wavelength of the conventional single-mode optical fiber 16, the 750 nm (or 850 nm) single-mode signal is regenerated into multimode as it is transmitted over the length of the optical fiber 16. However, the WDM 50 reconverts the 750 nm (or 850 nm) signal into single-mode for processing by the PIN-FET receiver 52, thereby increasing the S/N ratio.

The channel selection controller 56 provides polling signals that are modulated by the FSK modulator 58 for transmission to the subscriber terminals 14 with the composite signal provided by the signal combining unit 44. The polling signals prompt the subscriber terminals 14 to transmit stored service-request signals to the headend terminal 10. The polling signals may also be transmitted to the subscriber terminals 14 from the channel selector controller 56 over telephone lines 67 via a telephone interface unit 68.

The PIN-FET receiver 52 converts the received optical service-request signals 64 to electrical service-request signals on line 66. The service-request signals on line 66 are detected by the data detector 54 and provided to the channel selection controller 56.

The channel selection controller 56 responds dynamically to the received service request signals by controlling the digital switch 40 and the control computer 30 so that the digital switch 40 interconnects the source-signal conditioning unit 26 providing the television signal indicated by the service request signal received from a given subscriber terminal 14 with the upconverter 42 that frequency positions the television signal within the composite signal for transmission to the given subscriber terminal 14 over the given frequency channel that is enabled by the control signal provided by the control computer 30 that is transmitted to the given subscriber terminal 14.

The channel selection controller 56 responds in a like manner to service request signals received from subscribers over telephone lines 67 via the telephone interface unit 68.

Figure 3:
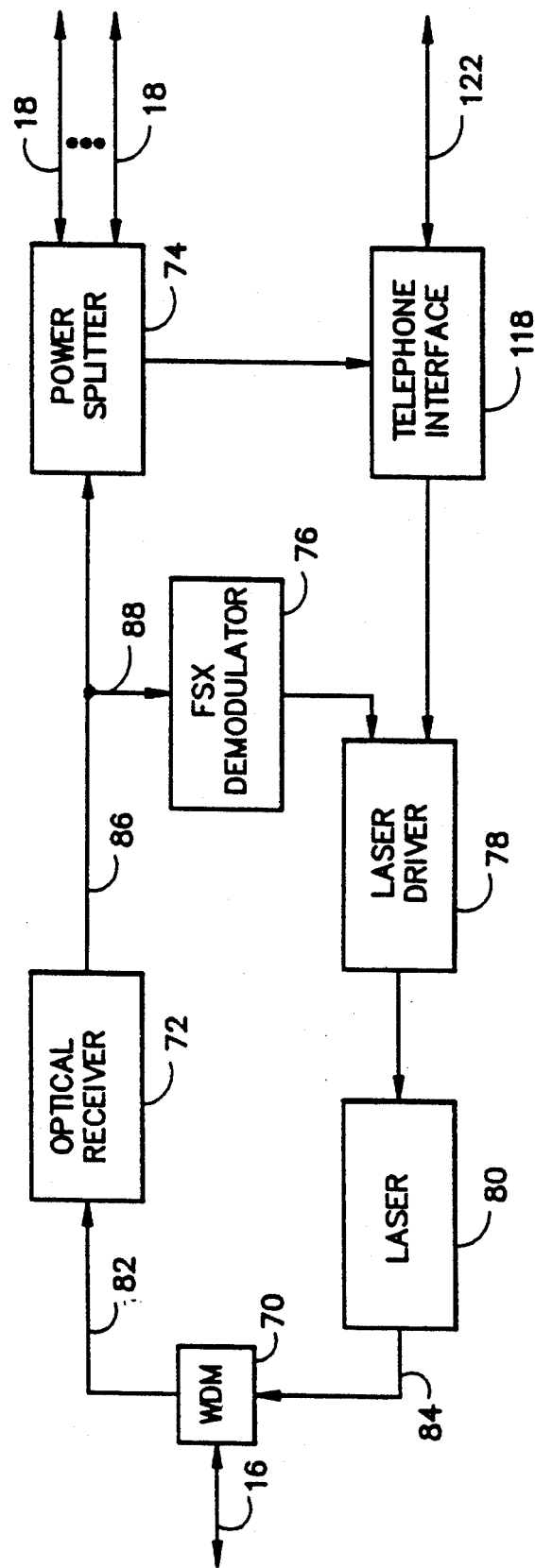
FIG. 3 is a diagram of a preferred embodiment of a distribution terminal in the system of FIG. 1.

Referring to FIG. 3, each distribution terminal includes a wavelength-division multiplexer/demultiplexer 70, an optical receiver 72, a power splitter 74, a FSK demodulator 76, a laser driver 78 and a laser 80. An ELED driver and an ELED may be included in lieu of the laser driver 78 and the laser 80, respectively.

The wavelength-division multiplexer/demultiplexer 70 couples the optical fiber 16 to both the optical receiver 72 and the laser 80 for enabling both the receipt of the composite optical signal 82 from the single-mode optical fiber 16 by the optical receiver 72 and the transmission by the laser 80 of optical service-request signals 84 over the single-mode optical fiber 16 to the headend terminal 10.

The connection of the wavelength-division multiplexer/demultiplexer 50 to one end of the single-mode optical fiber 16 at the headend terminal 10 and the connection of the wavelength-division multiplexer/demultiplexer 70 to the opposite end of the single-mode optical fiber 16 at the distribution terminal 12 enables bidirectional communication over the single single-mode optical fiber 16 between the headend terminal 10 and the distribution terminal 12, and thus effects a substantial savings in the quantity of optical fiber required for the system.

The wavelength-division multiplexer/demultiplexer 70 is similar to or identical with the WDM 50. The WDM 70 is adapted for propagating short-wavelength light over the single-mode optical fiber 16 to thereby transmit the optical service-request signal, or other low bandwidth signals, from the distribution terminal 12 to the headend terminal 10 and for simultaneously receiving long-wavelength light propagated over the same optical fiber 16, thereby enabling transmission of the optical television signal from the headend terminal 10 to the distribution terminal 12.

The optical receiver 72 converts the composite optical signal received over the optical fiber 16 from the headend terminal 10 into a composite electrical signal on line 86.

The power splitter 74 conditions the composite electrical signal on line 86 for transmission to the plurality of subscriber terminals 14 over the corresponding plurality of coaxial cables 18.

Electrical service-request signals 88 received over the coaxial cables 18 from the subscriber terminals 14 are demodulated by the FSK demodulator 76 and converted into optical service-request signals 84 by the laser driver 78 and the laser 80 for transmission to the headend terminal 10 over the optical fiber 16.

Figure 4:
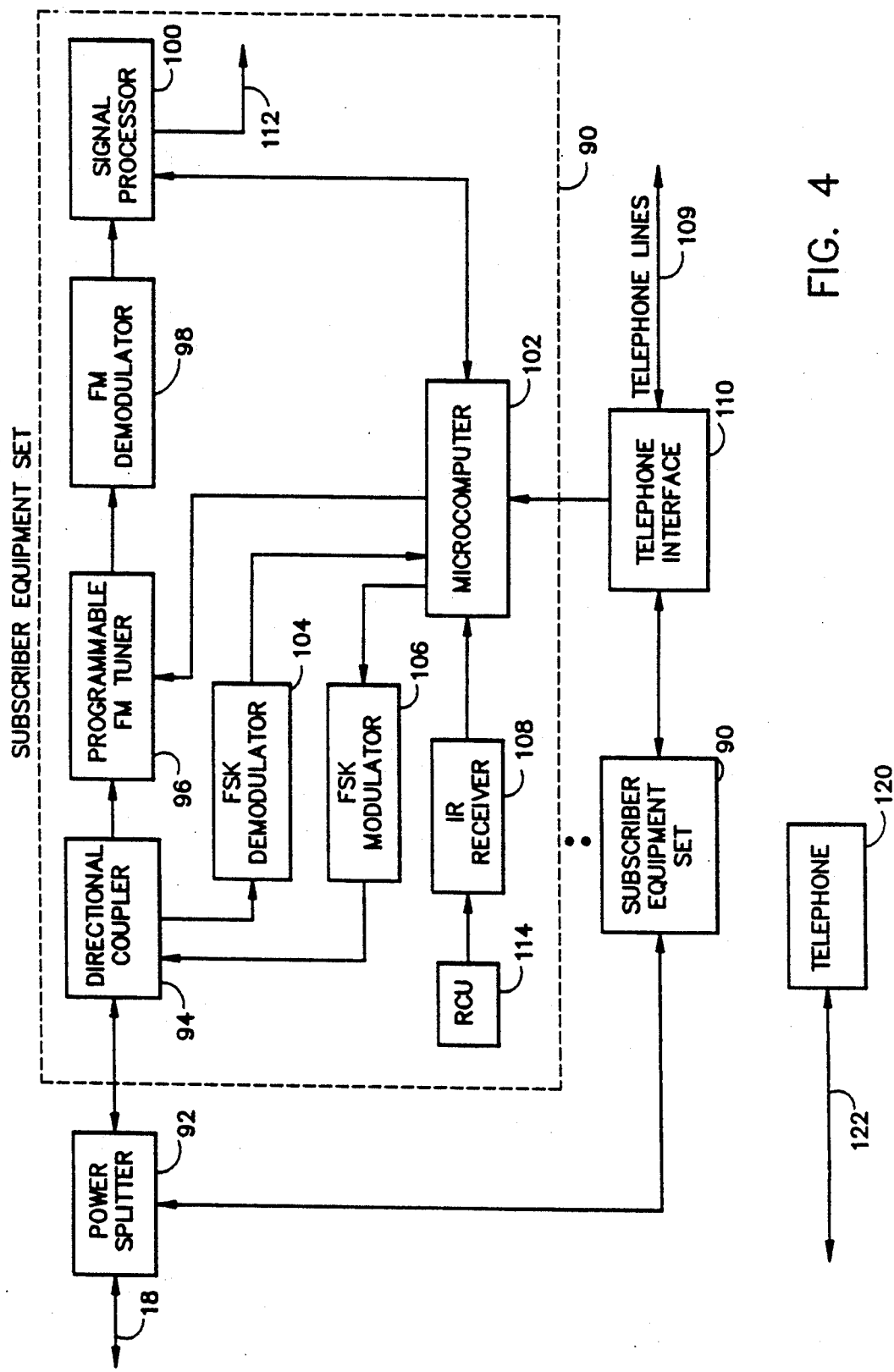
FIG. 4 is a diagram of a preferred embodiment of a subscriber terminal in the system of FIG. 1.

Referring to FIG. 4, each subscriber terminal 14 includes one or more sets of subscriber equipment 90. A power splitter 92 in each subscriber terminal 14 provides the composite signal received over the respective coaxial cable 16 to the different subscriber equipment sets 90. Each subscriber equipment set 90 includes a directional coupler 94, a programmable FM tuner 96, an FM demodulator 98, a signal processor 100, a microcomputer 102, an FSK demodulator 104, an FSK modulator 106 and an infrared (IR) receiver 108. Given subscriber equipment sets 90 also may include a telephone interface circuit 110.

In each subscriber equipment set 90, the composite television signal received from the coaxial cable 18 via the directional coupler 94 is passed through the programmable FM tuner 96 and the FM demodulator 98 to the signal processor 100. When the composite signal is received the programmable FM tuner 96 is tuned to one of the M different frequency channels included in the frequency band over which the composite signal is transmitted. The signal processor 100 extracts the control data contained in the television signal in the frequency channel to which the tuner 96 is then tuned and provides such control data to the microcomputer 102. The microcomputer 102 ascertain whether the extracted control data contains a control signal that enables the subscriber terminal to receive a television signal in the frequency channel to which the tuner 96 is then tuned. If not the microcomputer 102 programs the programmable FM tuner 96 for receiving a television signal over a different frequency channel. This process is repeated with the tuner 96 being reprogrammed for the M different frequency channels in a predetermined sequence until the microcomputer 102 ascertains that the extracted control data contains a control signal that enables the subscriber terminal to receive a television signal in the frequency channel to which the tuner 96 is then tuned. The signal processor 100 provides the demodulated television signal on line 112, which may be connected to a television set, VCR or other television signal output device.

When the received television signal on the enabled frequency channel is scrambled, the microcomputer 102 processes the extracted control data to provide control signals that are sent back to the signal processor 100 to enable the television signal to be descrambled by the signal processor 100.

In order to provide a service-request signal for transmission back to the headend terminal 10, a remote control unit (RCU) 114 is operated. The RCU 114 provides a coded infrared (IR) signal which is detected by the IR receiver 108, and stored in the microcomputer 102. When a polling signal is received by the microcomputer 102 from either the coaxial cable 18 via the directional coupler 94 and the FSK demodulator 104, or telephone lines 109 via the telephone interface unit 110, the microcomputer 102 provides the stored service-request signal onto the coaxial cable 18 via the FSK modulator 106 and the directional coupler 94 for transmission to the distribution terminal as a electrical service-request signal.

Cable systems providing CATV services sometimes also provide telephone services. The CATV system described herein optionally includes equipment for providing television services together with the CATV services. In the headend terminal a second telephone interface unit 116 receives and sends telephone from and to telephone lines 117. The second telephone interface unit 116 conditions received telephone signals for combination by the signal combining unit 44 with the television signals that are being transmitted. The telephone signals are likewise converted to optical signals and transmitted over a single-mode optical fiber 16 to the distribution terminal 12, where after reconversion to electrical signals, the telephone signals are transferred by the power splitter 74 to a telephone system interface unit 118. Telephone signals are communicated between the interface unit 116 and telephones 120 in the subscriber terminals 14 via twisted pairs 122. Telephone signals received by the distribution terminal 12 from the subscriber terminals 14 over the twisted pairs 122 are provided by the interface unit 118 to the laser driver 78 and laser 80, which convert such telephone signals into optical telephone signals for transmission over the conventional single-mode optical fiber 16 to the PIN-FET receiver 52 in the headend terminal 10. In the headend terminal 10, the PIN-FET receiver 52 converts the optical telephone signals into electrical telephone signals and provides the same to the second telephone interface unit 116 which sends such telephone signals over the telephone lines 117.

We claim:

1. A CATV system in which information signals for a plurality of subscribers are transmitted from a headend terminal to a plurality of distribution terminals, and then distributed from the distribution terminals to different subscriber terminals, comprising a headend terminal including
means for providing a plurality of information signals for a plurality of subscriber terminals;
switch means responsive to subscriber requests for dynamically selecting the plurality of information signals to provide a composite electrical signal; and
means for converting the composite electrical signal into a composite optical signal for transmission;

a plurality of distribution terminals, with each distribution terminal being coupled to the headend terminal by a separate single optical fiber for transmitting the composite optical signal from the converting means of the headend terminal to each distribution terminal, wherein each distribution terminal includes
means for receiving said transmitted composite optical signal and for converting it into electrical signals for distribution to the different subscriber terminals;
means for receiving electrical service-request signals from each of a plurality of said subscriber terminals; and
means for converting each received service-request signal into an optical service-request signal for transmission to the headend terminal; wherein the headend terminal further comprises means for receiving each
said transmitted optical service-request signal and for converting it into an electrical service-request signal for processing by the headend terminal; and a plurality of said subscriber terminals, wherein each subscriber terminal includes
means for receiving information signals transmitted to the subscriber terminal from a said distribution terminal over a plurality of different given frequency channels; and means responsive to a control signal transmitted to the subscriber terminal for enabling the receiving means to receive information signals transmitted to the subscriber terminal from said distribution terminal over a selected one of said different given frequency channels.

2. A system according to claim 1, wherein the switch means in the headend terminal operates in coordination with said control signal by frequency positioning the information signal indicated by the service request signal received from a given subscriber terminal within the composite signal for transmission to the given subscriber terminal over the given frequency channel enabled by the control signal that is transmitted to the given subscriber terminal.

3. A CATV system in which information signals for a plurality of subscribers are transmitted to different subscriber terminals, comprising a headend terminal including means for providing a plurality of information signals for a plurality of subscriber terminals;

switch means for selecting the plurality of information signals to provide a composite signal; and means for controlling said switch means in response to service-request signals received from the subscriber terminals; and a plurality of said subscriber terminals, wherein each subscriber terminal includes means for receiving information signals transmitted to the subscriber terminal over a plurality of different given frequency channels; and means responsive to a control signal transmitted to the subscriber terminal for enabling the receiving means to receive information signals transmitted to the subscriber terminal over a selected one of said different given frequency channels;

wherein the switch means in the headend terminal is responsive to said control signal for frequency positioning the information signal indicated by the service request signal received from a given subscriber terminal within the composite signal for transmission to the given subscriber terminal over the given frequency channel selected by the control signal that is transmitted to the given subscriber terminal.

4. A subscriber terminal for a CATV system in which a composite signal containing information signals for a plurality of subscribers is transmitted from a headend terminal to different subscriber terminals in response to service-request signals received from the subscriber terminals and a control signal that enables the subscriber terminal to receive information signals over a selected one of a plurality of different given frequency channels is transmitted from the headend terminal to the subscriber terminal, the subscriber terminal comprising programmable tuning means for receiving information signals transmitted to the subscriber terminal over said plurality of different give frequency channels;

means for receiving the control signal; and means responsive to the control signal received by the subscriber terminal for ascertaining whether the received control signal enables the subscriber terminal to receive information signals over the frequency channel to which the tuning means is then tuned, and, if not, for programming the tuning means to receive an information signal over a different one of the given frequency channels until the tuning means is tuned to the selected frequency channel.

5. A subscriber terminal for a CATV system in which a composite signal containing information signals for a plurality of different subscriber terminals selected by switch means in a headend terminal controlled in response to service-request signals received from the different subscriber terminals is transmitted from the headend terminal to the different subscriber terminals and a control signal that enables the subscriber terminal to receive information signals over a selected one of a plurality of different given frequency channels is transmitted from the headend terminal to the subscriber terminal, wherein the switch means in the headend terminal is responsive to said control signal for frequency positioning the information signal indicated by the service request signal received from a given subscriber terminal within the composite signal for transmission to the given subscriber terminal over the given frequency channel selected by the control signal that is transmitted to the given subscriber terminal, the subscriber terminal comprising means for receiving information signals transmitted to the subscriber terminal over said plurality of different given frequency channels;

means for receiving the control signal; and means responsive to the control signal received by the subscriber terminal for enabling the receiving means to receive information signals transmitted to the subscriber terminal over a selected one of said different given frequency channels.

* * * * *